United States Patent
Yu et al.

(10) Patent No.: US 9,698,438 B2
(45) Date of Patent: Jul. 4, 2017

(54) VENTILATION APPARATUS AND CONTROL METHOD THEREOF

(71) Applicants: Hyundai Motor Company, Seoul (KR); Wooshin Industrial Co., Ltd., Dangjin, Chungcheongnam-Do (KR)

(72) Inventors: Jung Han Yu, Gyeonggi-Do (KR); Jung Do Suh, Seoul (KR); Young Bum Kum, Seoul (KR); Duck Whan Kim, Seoul (KR); Chang Jun Lee, Gyeonggi-Do (KR); Tae Min Lee, Seoul (KR); Yong Woo Choi, Gyeonggi-Do (KR)

(73) Assignees: Hyundai Motor Company, Seoul (KR); Wooshin Industrial Co., Ltd., Dangjin, Chungcheongnam-do (KR)

(*) Notice: Subject to any disclaimer, the term of this patent is extended or adjusted under 35 U.S.C. 154(b) by 0 days.

(21) Appl. No.: 14/559,165

(22) Filed: Dec. 3, 2014

(65) Prior Publication Data
US 2016/0087293 A1 Mar. 24, 2016

(30) Foreign Application Priority Data
Sep. 18, 2014 (KR) ........................ 10-2014-0124150

(51) Int. Cl.
| | | |
|---|---|---|
| *H01M 8/04* | (2016.01) | |
| *H01M 8/04746* | (2016.01) | |
| *H01M 8/04223* | (2016.01) | |
| *H01M 8/2475* | (2016.01) | |
| *H01M 8/04119* | (2016.01) | |
| *H01M 8/04492* | (2016.01) | |

(52) U.S. Cl.
CPC ... *H01M 8/04776* (2013.01); *H01M 8/04171* (2013.01); *H01M 8/04179* (2013.01);
(Continued)

(58) Field of Classification Search
CPC ......... H01M 8/04776; H01M 8/04233; H01M 8/2475; H01M 8/04179; H01M 8/04492;
(Continued)

(56) References Cited

U.S. PATENT DOCUMENTS 5,760,488 A * 6/1998 Sonntag ................ B60L 3/0069
180/65.1
9,083,016 B1 * 7/2015 Saito .................... H01M 8/0662
(Continued)

FOREIGN PATENT DOCUMENTS

| JP | 2006-302606 A | 11/2006 |
| JP | 2007-042490 A | 2/2007 |
| JP | 2008-060044 A | 3/2008 |

(Continued)

OTHER PUBLICATIONS

Ichikawa, Dehumidifying Structure of fuel cell case, JP 2005-226472, Abstract English translation, Feb. 15, 2007.*

*Primary Examiner* — Alex Usyatinsky
(74) *Attorney, Agent, or Firm* — Mintz Levin Cohn Ferris Glovsky and Popeo, PC; Peter F. Corless

(57) ABSTRACT

A ventilation apparatus includes: a controller that determines whether insulation resistance between a fuel cell stack and an enclosure including the fuel cell stack is equal to or smaller than a preset value, and varies a degree of opening of a valve provided between an inlet provided on one side of the enclosure and an air blower injecting air to an interior of the enclosure through the inlet based on the determination.

13 Claims, 3 Drawing Sheets

(52) U.S. Cl.
CPC ... *H01M 8/04223* (2013.01); *H01M 8/04492* (2013.01); *H01M 8/2475* (2013.01); *H01M 2250/20* (2013.01); *Y02T 90/32* (2013.01)

(58) Field of Classification Search
CPC .......... H01M 8/04171; H01M 2250/20; Y02T 90/32
See application file for complete search history.

(56) References Cited

U.S. PATENT DOCUMENTS

| | | | | |
|---|---|---|---|---|
| 2004/0072052 A1* | 4/2004 | Yamamoto | ........ | H01M 8/04223 429/415 |
| 2005/0282058 A1* | 12/2005 | Yanagisawa | ...... | H01M 8/04156 429/508 |
| 2005/0282059 A1* | 12/2005 | Yanagisawa | ...... | H01M 8/04156 429/512 |
| 2008/0248369 A1* | 10/2008 | De Vaal | ............ | H01M 8/04268 429/425 |
| 2009/0186245 A1* | 7/2009 | Frank | ................ | H01M 8/04089 429/431 |
| 2010/0221623 A1* | 9/2010 | Pabst | ................ | H01M 8/04089 429/428 |
| 2012/0021313 A1* | 1/2012 | Yasuda | ............. | H01M 8/04201 429/416 |

FOREIGN PATENT DOCUMENTS

| | | |
|---|---|---|
| JP | 2008-218307 A | 9/2008 |
| KR | 10-2008-0103103 A | 11/2008 |
| KR | 10-2013-0133806 A | 12/2013 |
| KR | 10-2014-0067146 A | 11/2014 |

\* cited by examiner

VENTILATION APPARATUS AND CONTROL METHOD THEREOF

CROSS REFERENCE TO RELATED APPLICATION

The present application claims under 35 U.S.C. §119(a) the benefit of Korean Patent Application No. 10-2014-0124150, filed Sep. 18, 2014, which is incorporated by reference herein in its entirety.

BACKGROUND

1. Technical Field

The present invention relates to a ventilation apparatus for removing moisture from an interior of a fuel cell stack enclosure, and a control method thereof.

2. Description of the Related Art

A fuel cell system is a generation system that directly converts chemical energy of fuel into electrical energy. A fuel cell system includes a fuel cell stack generating electrical energy, a fuel supply device supplying fuel to the fuel cell stack, an air supply device supplying oxygen in the air as an oxidizing agent required for an electrochemical reaction to take place in the fuel cell stack, and a heat and water managing device removing a heat of reaction of the fuel cell stack to outside of the system and controlling an operation temperature of the fuel cell stack.

With this configuration, the fuel cell system generates electricity by the electrochemical reaction between hydrogen as fuel and oxygen in the air, and discharges heat and water as reaction products.

A fuel cell stack applied to a fuel cell vehicle is formed by continuously arranging unit cells, and in each unit cell, a membrane-electrode assembly (MEA) is positioned in the innermost portion. The MEA includes an electrolytic membrane capable of moving hydrogen ions, and catalytic layers, namely, a cathode and an anode, coated on both surfaces of the electrolytic membrane to allow hydrogen and oxygen to react with each other. Also, gas diffusion layers (GDLs) are positioned outside of the MEA, namely, outside of the cathode and the anode. Separators are positioned outside of the GDLs to supply fuel and air to the cathode and the anode and having a flow path formed to discharge water generated due to a reaction. End plates are positioned at both ends of the stack to hold the structure of the stacked cells.

In the stack, hydrogen and oxygen are ionized according to a chemical reaction by their respective catalytic layers, whereby an oxidization reaction occurs in an electrode to which hydrogen is supplied to generate hydrogen ions and electrons, and a reduction reaction occurs in an electrode to which oxygen is supplied to generate water as oxygen ions and hydrogen ions are reacted.

In general, a catalyst formed by including a platinum catalyst and a cocatalyst in a catalyst support formed of carbon is mainly used as an electrode catalyst used in a fuel cell. Namely, hydrogen is supplied to an anode, and oxygen is supplied to a cathode. Thus, hydrogen supplied to the anode is decomposed into hydrogen ions and electrons by the catalyst of the electrode layers formed on both sides of an electrolytic membrane. Among them, only the hydrogen ions selectively pass through the electrolytic membrane as a cation exchange membrane and are transmitted to the cathode. At the same time, electrons are transmitted to the cathode through a gas diffusion layer and a separator as conductors. In the cathode, the hydrogen ions supplied through the electrolytic membrane and the electrons transmitted through the separator meet oxygen in the air supplied to the cathode by the air supply device to cause a reaction of generating water. Due to migration of the hydrogen ions at this time, electrons flow through an external conducting wire, generating a current, and heat is incidentally generated in addition to water.

In general, in order to physically protect a fuel cell stack in which a high voltage is formed, the stack is housed in an enclosure. However, due to moisture introduced through a gap of the enclosure, moisture condensed due to a difference in temperature between an interior and an exterior of the enclosure due to exothermic reaction of the stack, or moisture partially leaked from the stack when the stack is operated, or the like, stack components within the enclosure is corroded or insulation resistance is degraded.

To overcome problems with conventional fuel cell stacks, the present invention proposes an apparatus for determining a moisture-removed environment within a stack enclosure and ventilating an interior of the enclosure, and a control method thereof.

The matters described above as a background art are merely described to promote understanding of the background of the present invention and should not be admitted as corresponding to a related art already known to a person skilled in the art.

SUMMARY

An object of the present invention is to provide a ventilation apparatus capable of controlling an amount of air supplied to an interior of an enclosure according to an insulation resistance between a fuel cell stack and the enclosure, and a control method thereof.

According to an exemplary embodiment of the present invention, there is provided a ventilation apparatus including: a controller that determines whether insulation resistance between a fuel cell stack and an enclosure including the fuel cell stack is equal to or smaller than a preset value, and varying a degree of opening of a valve provided between an inlet provided on one side of the enclosure and an air blower injecting air to an interior of the enclosure through the inlet based on the determination.

Before determining whether the insulation resistance is equal to or smaller than the preset value, the controller may open the valve to a reference degree of opening for a preset period of time depending on whether a vehicle is started at an initial stage.

When the insulation resistance is equal to or smaller than the preset value, the controller may increase the degree of opening of the valve.

After the valve was opened to the increased degree of opening, when a predetermined period of time has lapsed, the controller may determine the insulation resistance again and vary the degree of opening of the valve based on the re-determination result.

When the insulation resistance exceeds the preset value, the controller may adjust the degree of opening of the valve to the reference degree of opening.

After the valve was opened to the reference degree of opening, when the predetermined period of time has lapsed, the controller may determine the insulation resistance again and vary the degree of opening of the valve based on the re-determination result.

The ventilation apparatus may further include: an inlet pipe extending from the inlet to the interior of the enclosure and guiding air injected through the inlet to be distributed to the interior of the enclosure; and an outlet pipe extending from an outlet provided on one side or the other side of the enclosure to the interior of the enclosure and guiding air within the enclosure to be discharged through the outlet.

The inlet pipe and the outlet pipe may have a plurality of holes having a predetermined pattern formed on a surface thereof.

Distances between the plurality of holes may be equal.

Distances between the plurality of holes may be increased by preset distances each time in one direction.

The plurality of holes may congregate at predetermined intervals.

The plurality of holes may be arranged at predetermined intervals and have a rectangular shape.

The plurality of holes may have a curve shape and may be connected to adjacent holes.

The air blower may receive air discharged through the outlet from the interior of the enclosure.

A dehumidifying agent may be provided within the enclosure.

According to another exemplary embodiment of the present invention, there is provided a method for controlling a ventilation apparatus, including: measuring insulation resistance between a fuel cell stack and an enclosure including the fuel cell stack; determining whether the measured insulation resistance is equal to or smaller than a preset value; and when the insulation resistance is equal to or smaller than the preset value in the determination operation, increasing a degree of opening of a valve provided between an inlet provided on one side of the enclosure and an air blower injecting air to the interior of the enclosure through the inlet.

The method may further include: determining whether a vehicle is started at an initial stage before the determination operation; and when the vehicle is started at an initial stage, opening the valve to a reference degree of opening for a preset period of time.

The method may further include: when the insulation resistance exceeds the preset value in the determination operation, adjusting the degree of opening of the valve to the reference degree of opening.

The method may further include: when the degree of opening of the valve is increased or when the degree of opening of the valve is adjusted to the reference degree of opening, maintaining the degree of opening of the valve for a predetermined period of time, wherein when the predetermined period of time has lapsed, the measuring of the insulation resistance may be performed.

A non-transitory computer readable medium containing program instructions executed by a controller preferably includes: program instructions that measure insulation resistance between a fuel cell stack and an enclosure including the fuel cell stack; and program instructions that determine whether the measured insulation resistance is equal to or smaller than a preset value, and if the insulation resistance is equal to or smaller than the preset value, a degree of opening of a valve is increased between an inlet provided on one side of the enclosure and an air blower injecting air to the interior of the enclosure through the inlet.

DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a ventilation apparatus according to an exemplary embodiment of the present invention will be described with reference to the accompanying drawings.

Figure 1:
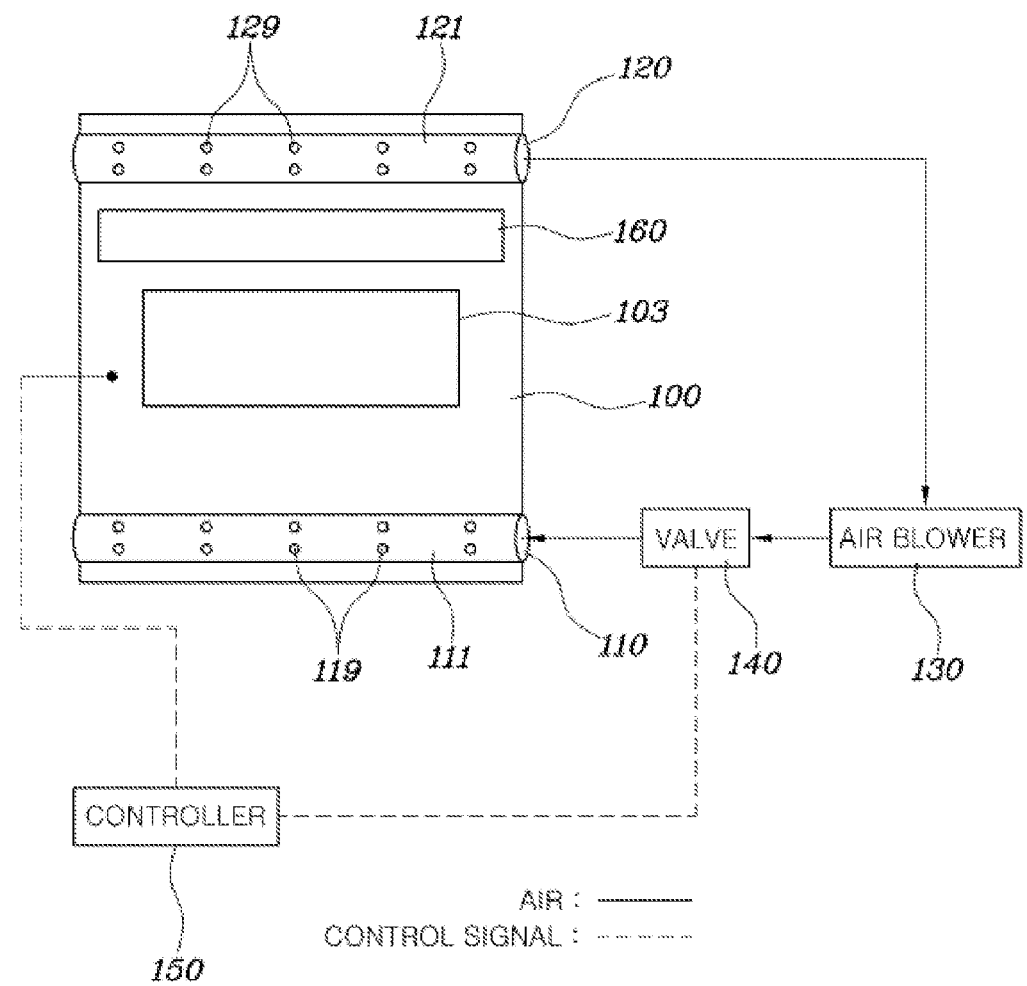
FIG. 1 is a view illustrating a ventilation apparatus according to an exemplary embodiment of the present invention.
Figure 2:
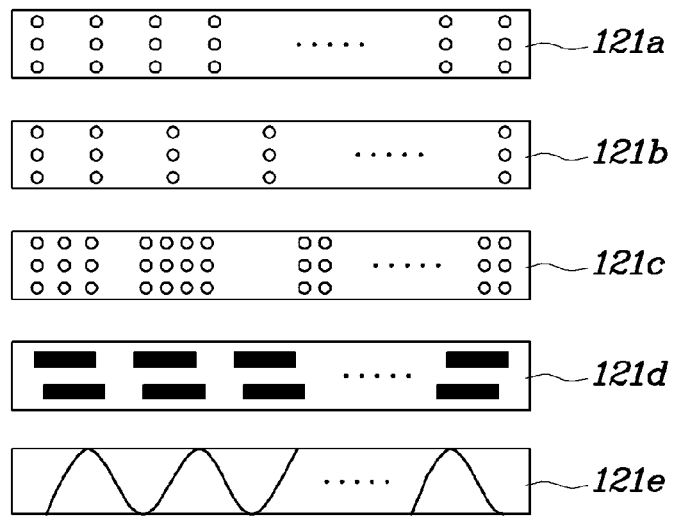
FIG. 2 is a view illustrating patterns of a plurality of holes of an inlet pipe according to the exemplary embodiment of the present invention.
Figure 3:
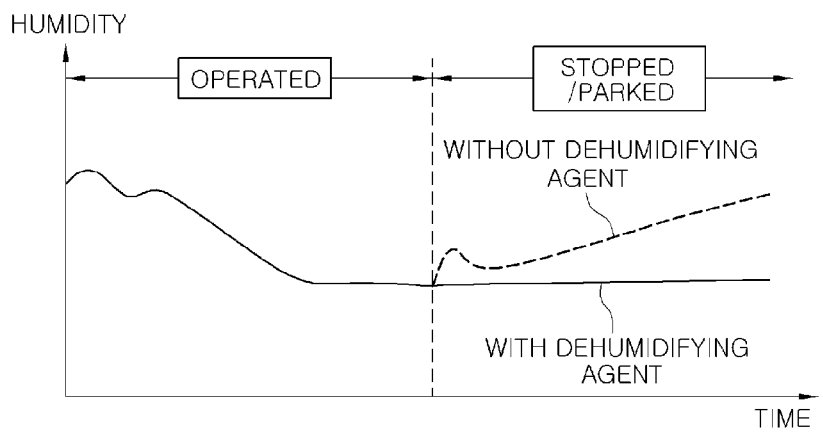
FIG. 3 is a graph illustrating a difference in performance between a ventilation apparatus with a dehumidifying agent according to the exemplary embodiment of the present invention and a ventilation apparatus without a dehumidifying agent.

FIG. 1 is a view illustrating a ventilation apparatus according to an exemplary embodiment of the present invention. FIG. 2 is a view illustrating patterns of a plurality of holes of an inlet pipe according to the exemplary embodiment of the present invention. FIG. 3 is a graph illustrating a difference in performance between a ventilation apparatus with a dehumidifying agent according to the exemplary embodiment of the present invention and a ventilation apparatus without a dehumidifying agent. Referring to FIGS. 1 through 3, a ventilation apparatus may include a controller 150 that determines whether insulation resistance between a fuel cell stack 103 and an enclosure 100 including the fuel cell stack 103 is equal to or smaller than a preset value, and varying a degree of opening of a valve 140 provided between an inlet 110 provided on one side of the enclosure 100 and an air blower 130 injecting air to an interior of the enclosure 100 through the inlet 110 based on the determination.

The air blower 130 according to an exemplary embodiment of the present invention, provided in an existing fuel cell system, ventilates the interior of the enclosure 100 by utilizing high temperature air emitted from the air blower 130. Thus, the present invention may be applied without a separate additional air supply device.

Generally, if the space between the fuel cell stack 103 and the enclosure 100 is in a dry optimal environment, a high insulation resistance value is measured. However, when moisture is introduced to or condensed in the interior of the enclosure 100, insulation resistance is reduced. Thus, by measuring insulation resistance between the fuel cell stack 103 and the enclosure 100, the controller 150 may determine whether moisture has been introduced to or condensed within the enclosure 100.

Also, the valve 140 is provided between the enclosure 100 and the air blower 130. When a degree of opening of the valve 140 is increased, an amount of air introduced to the interior of the enclosure 100 from the air blower 130 may be increased to maximize a ventilation effect. Meanwhile, when the degree of opening of the valve 140 is reduced, an amount of air introduced to the interior of the enclosure 100 from the air blower 130 is reduced.

In an exemplary embodiment of the present invention, before determining whether the insulation resistance is equal to or smaller than a preset value, the controller 150 may open the valve 140 to a reference degree of opening for a preset period of time depending on whether a vehicle is initially started. For example, when the vehicle is turned on to be started, the controller 150 may open the valve 140 to a reference degree of opening for a preset period of time to prevent the valve 140 from frequently operating due to controlling at an initial stage of stack operation, thus enhancing reliability of controlling.

Also, when the insulation resistance is equal to or smaller than the preset value, the controller 150 may increase the degree of opening of the valve 140, and when a predetermined period of time has lapsed after the valve 140 was opened to the increased degree of opening, the controller 150 may determine the insulation resistance again and vary the degree of opening of the valve 140 based on the re-determination result.

Meanwhile, when the insulation resistance exceeds the preset value, the controller 150 may adjust the degree of opening of the valve 140 to the reference degree of opening and when a predetermined period of time has lapsed after the valve 140 was opened to the reference degree of opening, the controller 150 may determine the insulation resistance again and vary the degree of opening of the valve 140 based on the re-determination result.

For example, when the insulation resistance between the fuel cell stack 103 and the enclosure 100 is equal to or smaller than the preset value, the controller 150 may determine that there is a large amount of moisture within the enclosure 100 and increase the degree of opening of the valve 140 to allow a large amount of air to be introduced from the air blower 130. Thereafter, by opening the valve 140 to the increased degree of opening, it is possible to prevent a disruption or momentary discontinuation of controlling due to an instant increase in the insulation resistance.

Conversely, when the insulation resistance between the fuel cell stack 103 and the enclosure 100 exceeds the preset value, the controller 150 determines that an amount of moisture within the enclosure 100 is within a normal range, and adjusts the degree of opening of the valve 140 to the reference degree of opening.

Meanwhile, the ventilation apparatus according to an exemplary embodiment of the present invention may further include: an inlet pipe 111 extending from the inlet 100 to the interior of the enclosure 100 and guiding air injected through the inlet 110 to be distributed to the interior of the enclosure 100; and an outlet pipe 121 extending from an outlet 120 provided on one side or the other side of the enclosure 100 to the interior of the enclosure 100 and guiding air within the enclosure 100 to be discharged through the outlet 120. The inlet pipe 111 and the outlet pipe 121 may have a plurality of holes 119 and 129 having a predetermined pattern formed on a surface thereof.

This is to maximize a ventilation effect within the enclosure 100, and since the plurality of holes 119 and 129 are formed in the entire section of the enclosure 100 in the inlet pipe 111 and the outlet pipe 121, air supplied from the air blower 130 may effectively circulate through the entirety of the interior of the enclosure 100 without a section in which air is stagnant.

The air blower 130 may receive air discharged through the outlet from the interior of the enclosure 100. The air which has circulated through the interior of the enclosure 100 is cooled by latent heat of moisture within the fuel cell stack 103 and by a wall surface of the enclosure 100 and re-supplied to the air blower 130 through the outlet 120, whereby the air blower 130 may be easily cooled and air of the air blower 130 is not lost.

As illustrated in FIG. 2, distances between the plurality of holes of the inlet pipe 111 preferably are equal (121a). Also, distances between the plurality of holes of the inlet pipe 111 are increased by preset distances each time in one direction (121b). Further, the plurality of holes congregate at predetermined intervals (121c). Additionally, the plurality of holes of the inlet pipe 111 are arranged at predetermined intervals and have a rectangular shape (121d). Yet further, the plurality of holes of the inlet pipe 111 may have a curved shape and may be connected to adjacent holes (121e).

Namely, since a ventilation effect within the enclosure 100 is varied depending on a configuration of the components of the fuel cell stack 103 within the enclosure 100, the inlet pipe 111 needs to include a plurality of holes 119 in different patterns in consideration of differential pressure and circularity within the enclosure 100. A plurality of holes 129 in various patterns may be applied to the outlet pipe 121, like the inlet pipe 111.

Meanwhile, a dehumidifying agent 160 may be provided in the enclosure 100.

Ventilation within the interior of the enclosure 100 through the air blower 130 may be performed in a state in which a vehicle is turned on or started. In a state in which the vehicle is stopped or parked, the air blower 130 does not operate, and thus, ventilation using the air blower 130 does not occur. Thus, in an exemplary embodiment of the present invention, even in a state in which the vehicle is stopped or parked and the air blower 130 does not operate, the dehumidifying agent 160 is applied to reduce moisture condensation within the enclosure 100.

For example, when the vehicle is stopped or parked so as to be in an OFF state, the dehumidifying agent 160 removes moisture to maintain the interior of the enclosure 100 at predetermined humidity. Here, after the vehicle is operated, humidity is low and the burden on the function of the dehumidifying agent 160 is reduced, and an increase in humidity when the dehumidifying agent 160 is not applied as illustrated in FIG. 3 may be prevented to maintain the interior of the enclosure 100 in a drier state.

Also, when the vehicle is turned on to be started, the dehumidifying agent 160 holding moisture therein is recovered to a dry state due to high-temperature, dry air from the air blower 130. Namely, since the dehumidifying agent 160 may be repeatedly used, the interior of the enclosure 100 may be maintained to be dry even at low costs.

In particular, since the dehumidifying agent 160 is provided in the vicinity of the outlet pipe 121 as illustrated in FIG. 1, the dehumidifying agent 160 may also serve as a filter to prevent introduction of a foreign object to the outlet pipe 121, as well as to perform a dehumidifying role.

Hereinafter, a method for controlling a ventilation apparatus according to an exemplary embodiment of the present invention will be described with reference to the accompanying drawings.

Figure 4:
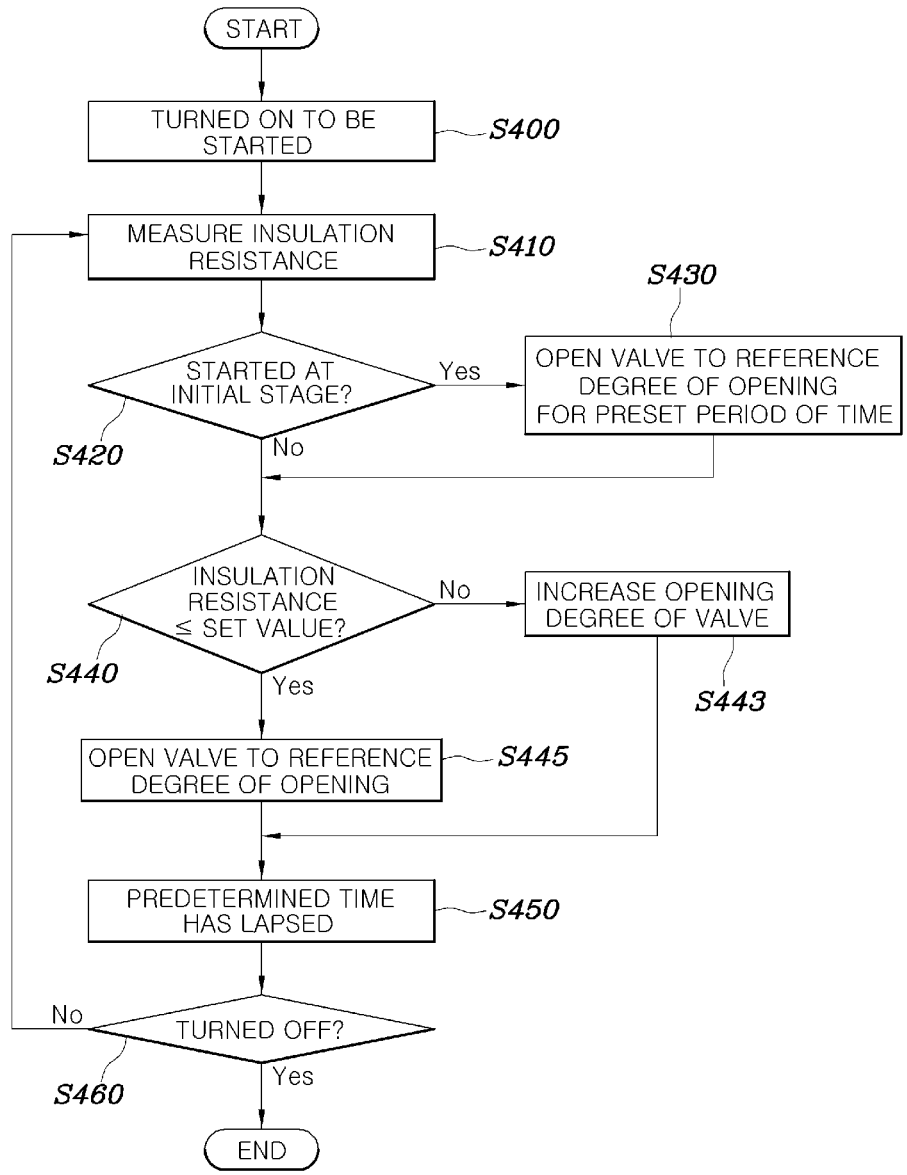
FIG. 4 is a flow chart illustrating a method for controlling a ventilation apparatus according to the exemplary embodiment of the present invention.

FIG. 4 is a flow chart illustrating a method for controlling a ventilation apparatus according to the exemplary embodiment of the present invention. Referring to FIG. 4, the method for controlling a ventilation apparatus may include: measuring insulation resistance between the fuel cell stack 103 and the enclosure 100 including the fuel cell stack 103 (S410); determining whether the measured insulation resistance is equal to or smaller than a preset value (S440); and increasing a degree of opening of the valve 140 provided between the inlet 110 provided on one side of the enclosure 100 and the air blower 130 injecting air to the interior of the enclosure 100 through the inlet 110, when the insulation resistance is equal to or smaller than the preset value in the determination operation in S440 (S443).

Controlling may start when the vehicle is turned on or started (S400).

Also, the method may further include determining whether the vehicle is started at an initial stage (S420) before the determination operation in S440; and opening the valve to a reference degree of opening for a preset period of time when the vehicle is started at an initial stage (S430).

Meanwhile, the method may further include adjusting the degree of opening of the valve to the reference degree of opening when the insulation resistance exceeds the preset value in the determination operation in S440 (S445).

The method may further include: maintaining the degree of opening of the valve 140 for a predetermined period of time (S450), when the degree of opening of the valve 140 is increased in S443 or when the degree of opening of the valve 140 is adjusted to the reference degree of opening in S445, and when the predetermined period of time has lapsed, the measuring of the insulation resistance is performed in S410.

Here, before the insulation resistance is measured as the predetermined period of time has lapsed, it is determined whether the vehicle is turned off (S460) to determine whether to continuously perform controlling.

In the ventilation apparatus and the control method thereof configured as described above, since high temperature air is injected to the interior of the enclosure 100, moisture within the enclosure 100 can be removed and moisture condensation within the enclosure 100 can be prevented, preventing corrosion of components and a degradation of electrical insulation resistance due to moisture and securing electrical safety.

Also, since air circulates within the enclosure 100, when hydrogen is leaked from the stack, hydrogen concentration can be reduced. Accordingly, a possibility of explosion due to hydrogen can be reduced.

Further, since the dehumidifying agent 160 is applied to the interior of the enclosure 100, the interior of the enclosure 100 may be kept dry even when the vehicle is stopped or parked.

Additionally, since the plurality of holes 119 and 129 of the inlet pipe 111 and the outlet pipe 121 are provided in various patterns, ventilation may be smoothly performed according to internal configurations of the enclosure 100.

Yet further, since a coolant is not required for cooling the air blower 130, space utilization of the vehicle can be increased.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A ventilation apparatus, comprising:
   a controller programmed to determine whether insulation resistance between a fuel cell stack and an enclosure including the fuel cell stack is equal to or smaller than a preset value, and when the insulation resistance is equal to or smaller than the present value, increase a degree of opening of a valve provided between an inlet provided on one side of the enclosure and an air blower injecting air to an interior of the enclosure through the inlet based on the determination;
   an inlet pipe extending from the inlet to the interior of the enclosure and guiding air injected through the inlet to be distributed to the interior of the enclosure; and
   an outlet pipe extending from an outlet provided on one side or the other side of the enclosure to the interior of the enclosure and guiding air within the enclosure to be discharged through the outlet.

2. The ventilation apparatus of claim 1, wherein before determining whether the insulation resistance is equal to or smaller than the preset value, the controller is programmed to open the valve to a reference degree of opening for a preset period of time depending on whether a vehicle is started at an initial stage.

3. The ventilation apparatus of claim 1, wherein after the valve was opened to the increased degree of opening, when a predetermined period of time has lapsed, the controller is programed to determine the insulation resistance again and vary the degree of opening of the valve based on the re-determination result.

4. A ventilation apparatus, comprising:
   a controller programmed to determine whether insulation resistance between a fuel cell stack and an enclosure including the fuel cell stack is equal to or smaller than a preset value, and when the insulation resistance exceedes the present value, adjust a degree of opening of a valve to a reference degree in which the valve is provided between an inlet provided on one side of the enclosure and an air blower injecting air to an interior of the enclosure through the inlet based on the determination;

an inlet pipe extending from the inlet to the interior of the enclosure and guiding air injected through the inlet to be distributed to the interior of the enclosure; and an outlet pipe extending from an outlet provided on one side or the other side of the enclosure to the interior of the enclosure and guiding air within the enclosure to be discharged through the outlet.

5. The ventilation apparatus of claim 1, wherein the inlet pipe and the outlet pipe have a plurality of holes having a predetermined pattern formed on a surface thereof.

6. The ventilation apparatus of claim 5, wherein distances between the plurality of holes are equal.

7. The ventilation apparatus of claim 5, wherein distances between the plurality of holes are increased by preset distances each time in one direction.

8. The ventilation apparatus of claim 5, wherein the plurality of holes congregate at predetermined intervals.

9. The ventilation apparatus of claim 5, wherein the plurality of holes are arranged at predetermined intervals and have a rectangular shape.

10. The ventilation apparatus of claim 5, wherein the plurality of holes have a curved shape and are connected to adjacent holes.

11. The ventilation apparatus of claim 1, wherein the air blower receives air discharged through the outlet from the interior of the enclosure.

12. The ventilation apparatus of claim 1, wherein a dehumidifying agent is provided within the enclosure.

13. The ventilation apparatus of claim 4, wherein after the valve was opened to the reference degree of opening, when the predetermined period of time has lapsed, the controller is programmed to determine the insulation resistance again and vary the degree of opening of the valve based on the re-determination result.

* * * * *